United States Patent
Nori et al.

(10) Patent No.: US 9,336,060 B2
(45) Date of Patent: May 10, 2016

(54) MIDDLEWARE SERVICES FRAMEWORK FOR ON-PREMISES AND CLOUD DEPLOYMENT

(75) Inventors: Anil K. Nori, Redmond, WA (US); Dharma Shukla, Sammamish, WA (US); Yann Christensen, Seattle, WA (US); Murali Krishnaprasad, Redmonds, WA (US); Igor Sedukhin, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 58 days.

(21) Appl. No.: 13/163,620

(22) Filed: Jun. 17, 2011

(65) Prior Publication Data

US 2012/0324069 A1   Dec. 20, 2012

(51) Int. Cl.
  *G06F 15/177*  (2006.01)
  *G06F 9/50*   (2006.01)
  *H04L 12/24*  (2006.01)
  *H04L 29/08*  (2006.01)
  *G06F 11/14*  (2006.01)

(52) U.S. Cl.
  CPC .......... *G06F 9/5066* (2013.01); *H04L 41/0806* (2013.01); *G06F 11/1482* (2013.01); *H04L 67/10* (2013.01)

(58) Field of Classification Search
  CPC ........................ H04L 41/5041; H04L 67/125
  USPC .......................................................... 709/222
  See application file for complete search history.

(56) References Cited

U.S. PATENT DOCUMENTS

| | | | |
|---|---|---|---|
| 7,707,240 B2 * | 4/2010 | Marascio et al. | 709/202 |
| 7,856,500 B2 * | 12/2010 | Dasgupta et al. | 709/226 |
| 7,873,422 B2 * | 1/2011 | Dumas et al. | 700/29 |
| 2002/0039350 A1 * | 4/2002 | Wang et al. | 370/230.1 |
| 2002/0054055 A1 * | 5/2002 | Sone | 345/700 |
| 2002/0059425 A1 * | 5/2002 | Belfiore et al. | 709/226 |
| 2003/0172145 A1 * | 9/2003 | Nguyen | 709/223 |
| 2005/0021818 A1 * | 1/2005 | Singhal et al. | 709/232 |
| 2005/0044197 A1 * | 2/2005 | Lai | 709/223 |
| 2005/0166180 A1 * | 7/2005 | Lemon et al. | 717/106 |
| 2005/0222969 A1 * | 10/2005 | Yip et al. | 707/1 |
| 2006/0064481 A1 * | 3/2006 | Baron et al. | 709/224 |
| 2006/0159077 A1 * | 7/2006 | Vanecek, Jr. | 370/360 |
| 2007/0130208 A1 * | 6/2007 | Bornhoevd et al. | 707/104.1 |
| 2009/0328038 A1 * | 12/2009 | Yamada et al. | 718/1 |

(Continued)

OTHER PUBLICATIONS

Microsoft, "Windows Azure AppFabric Overview," retrieved from: http://www.microsoft.com/windowsazure/AppFabric/Overview/default.aspx, retrieved on Mar. 15, 2011, (2 pages).

(Continued)

*Primary Examiner* — Hua Fan
(74) *Attorney, Agent, or Firm* — Ben Tabor; Kate Drakos; Micky Minhas

(57) ABSTRACT

A framework and middleware services for developing, deploying and managing composite applications is disclosed. The middleware services may be deployed on-premises or in the cloud. The framework includes a rich collection of middleware services, an application model to compose services into a composite application, a high-density multi-tenant scalable container to host the composition logic, and unified lifecycle management of the composite application and its constituent services.

17 Claims, 5 Drawing Sheets

(56) References Cited

U.S. PATENT DOCUMENTS

2010/0037035 A1* 2/2010 Archer et al. .................. 712/28
2010/0077386 A1* 3/2010 Akkiraju et al. ............. 717/136

OTHER PUBLICATIONS

Unknown, "Service Composition," retrieved from: http://www.sdn.sap.com/irj/sdn/nw-composition?rid=/webcontent/uuid/30f3491b-9a49-2a . . . , retrieved on Mar. 15, 2011, (1 page).

WSO2, "WSO2 Launches New Middleware Services for Creating and Composing SOA Services in the Cloud," retrieved from: http://wso2.com/about/news/wso2-launches-new-middleware-services-for-creating-and-co . . . , retrieved on Mar. 15, 2011, dated Nov. 15, 2010, (3 pages).

Developerworks, "Develop and Deploy Multi-Tenant Web-delivered Solutions using IBM middleware: Part 2: Approaches for enabling multi-tenancy," retrieved from: http://www.ibm.com/developerworks/webservices/library/ws-multitenantpart2/index.html, retrieved on Mar. 15, 2011, dated May 20, 2009, (17 pages).

Oracle, "Extending Oracle Siebel CRM with Oracle Fusion Middleware," An Oracle White Paper, Mar. 2007, (23 pages).

* cited by examiner

MIDDLEWARE SERVICES FRAMEWORK FOR ON-PREMISES AND CLOUD DEPLOYMENT

BACKGROUND

Businesses are under increasing competitive pressure to develop applications that are faster to build and deploy. The applications must be flexible to meet the demands of the ever changing business processes and must control operation and management costs. Business competitiveness is achieved through a coordinated movement of the entire business—designing, buying, selling, planning and servicing. There is no single application or system that provides all the business functions in a manner customized for the business. Individual business functions, however, are typically provided by custom or packaged applications in a siloed manner. It is a challenge to compose existing applications into cohesive, collaborative, self-service, and customized applications.

Current application platforms have not evolved to provide a uniform platform across technologies and tiers or to supporting the end-to-end life cycle of service compositions. Current platforms are generally single nodes that host individual application components in silos. Current applications must develop, deploy, and manage the application silos and the middleware infrastructure across different tiers. A lack of cohesion across the composition of application components, and the disconnected management across different application and infrastructure services, makes it difficult to adopt middleware technologies for building composite applications. In addition, there is currently no end-to-end application model/definition. The definition and the boundaries of applications are in minds of application developers and application administrators. The lack of a comprehensive application definition and runtime support make application administration—e.g. application deployment and management—complex and expensive. Application administration is further impacted by technology shifts such as cloud computing. For example, the advent of cloud technology makes composite applications even more distributed and loosely-coupled leading to increasingly complex application management.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Applications composing other application or middleware services are known as "composite applications." Composite applications are built by assembling intra- and inter-application components and middleware services based on an application model that supports the complete lifecycle of the application. Surround applications are applications surrounding or layered on existing packaged/legacy applications and services. Surround applications are ideal for building dynamic, collaborative, self-service business solutions. Such surround applications need to be highly configurable, customizable, and changeable. Due to its inherent nature of services composition, composite application can span businesses, are extensible, and future-proof.

The terms "component" and "service" are used somewhat interchangeably in this document. In service-oriented architecture, logic is typically developed as a component but—once deployed—the logic is exposed as a service. Generally, as used herein, the term "component" is used in the development context, and the term "service" is used in the post-deployment context.

The middleware platform deploys the composite application and its components to elastic cloud roles. The application can contain both stateless and stateful components. The middleware platform provides mechanisms for state partitioning for scale, state replication for availability, and state persistence for durability. Because the platform manages the state, applications are relieved of complex state management in their logic. The middleware platform provides mechanisms for application provisioning, component deployment, dynamic scale, availability, and end-to-end application management. The middleware platform offers flexible and secure high-density and multi-tenancy.

In addition to custom logic authoring, the applications may require middleware services such as caching for low-latency data access and application scale, queues and pub/sub for asynchronous messaging, stateful workflows for long running transactions, and database access for persistence. The middleware platform offers a rich set of middleware services. These services include:

Distributed Caching for application performance, scale, and availability;

Messaging for queues and pub/sub;

Connectivity between services, within and across enterprises;

Workflows for stateless and stateful, long running logic;

Transforms and Adapters for supporting enterprise integration workloads;

Security services for authentication; and

Container services for running stateless and stateful logic.

The middleware platform provides the rich collection of services and enables developing and deploying new middleware services. The middleware platform supports provisioning, dynamic scale, and multi-tenancy of applications and services. The middleware platform also provides support for end-to-end application management as well as management of the services. Finally, the middleware platform provides support for application monitoring, metering, and billing.

A description of the composite application is required for on-premises server deployments and for cloud deployments. An application's intent and requirements are captured in an application model so that they can be enforced by the middleware platform. This also allows for cohesive management of the composite application. Applications specify the behavior and connections between the components. The choice of implementation may be late-bound and may be chosen only at runtime. An application may span on-premises and cloud boundaries, which may require connections across these boundaries. The application model may specify Service Level Agreements (SLA) on the application or components/services. The application model supports aggregate monitoring and management by providing end-to-end knowledge of the composite application, enables throttling and resource control of the component/services and at the application level, and enables consolidated end-to-end metering and billing.

The middleware platform provides a rich developer programming environment and tools for rapid application development and end-to-end composite application definition.

The middleware platform provides management of the distributed composite application. Composite applications include multiple application components and are distributed across technology tiers. Managing the composite application requires managing all the components that constitute the application across all tiers, including web tier, app tier, midtier, and data tier. The middleware platform manages these components cohesively across their lifecycle. For example, removing the application removes all of the components, and stopping or starting the application stops or starts, respectively, all of the application's components. Deploying the application deploys all of the components to the appropriate tiers and configures the components for execution. The end-to-end application definition supports composite application management by providing knowledge of which components form the composite application and their inter-relationships, which allows composite application management to map the management operations accordingly to the components.

The cloud shift is on-going and the cloud future looks promising, but there will always be on-premises or server-based applications. Accordingly, both environments will continue to exist and composite applications may be deployed in either or both environments. In addition, a "hybrid" environment is also possible in which both on-premises and cloud environments will co-exist, and composite applications may span both environments. For example, a hybrid environment may be used where mission critical data and applications reside on-premises and other, less critical, data and applications may be deployed in the cloud. The middleware platform supports hybrid environments by supporting connectivity for services spanning on-premises and cloud deployments. The middleware platform provides similar or symmetric application development, deployment, and management experience for on-premises and cloud.

DRAWINGS

DETAILED DESCRIPTION

Figure 1:
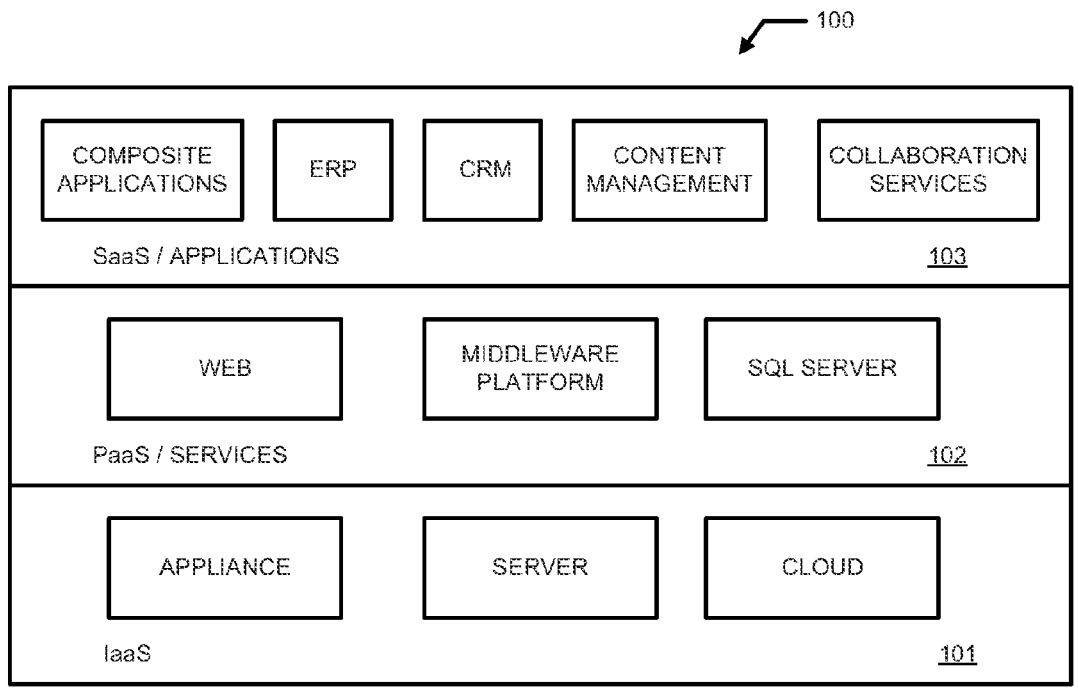
FIG. 1 illustrates the layering of services in an application stack according to one embodiment.

Composite applications include multiple application components distributed across different technology tiers. Composite applications are built by assembling application components and middleware services based on an application model that supports the complete lifecycle of the application. For example, an online shopping site may be embodied as a composite application. If a reseller wishes to build an online shopping site for selling goods, the online site may need to support the following capabilities: (1) a catalog of goods; (2) a shopping cart for purchasing items; (3) checkout for placing orders using credit cards; and (4) a check order status. This is a collection of services where each service by itself is developed as a composite application.

Such an application may have the following structure. Front-end ASP.NET web components that provide catalog browsing, shopping cart, checkout, and check order status. The catalog browsing component provides searching, querying, and browsing of a product catalog. When users decide to purchase an item, they place the item in a shopping cart. When they are ready to purchase, the user initiates a checkout process and provides credit card information. The checkout web component passes shopping cart and credit card information to the checkout service. Users invoke an order status web service to check the status of the orders they placed.

A caching service holds data for product catalog, shopping cart, and user sessions in memory. The catalog web (e.g. ASP.NET) component uses the cache service for efficient browsing experience. The cache service also provides shopping cart management.

A checkout component captures checkout logic. The checkout component may be based on Windows Workflow Foundation (WF), which provides a programming model for building workflow-enabled applications. Checkout takes the purchases in a shopping cart and submits them to an order queue service, processes the credit card payment, and returns a checkout confirmation to the buyer. The checkout component (e.g. WF) is deployed to a container service which hosts and runs the checkout logic.

An order processing (e.g. WF-based) component de-queues the shopping cart from the order queue, creates an order, and submits the order to a backend order management service for order processing and delivery. This may occur, for example, via a Windows Communication Foundation (WCF) adapter for the backend order management service. WCF is a set of .NET technologies for building and running connected systems. WCF provides a unified programming model for rapidly building service-oriented applications that communicate across the web and the enterprise.

An order status web component checks the status of the order, for example, via the WCF adapter for order management service.

An order queue holds the shopping carts for order processing.

Service-based access is granted to external services, such as a credit card processing system and the order management system as needed via, for example, the WCF adapter.

This simple composite application illustrates some basic characteristics that form the fundamental requirements for any composition of application services. First, the components of the application are deployed to different services backed by different technologies. For example, the ASP.NET components are deployed to the web service or web hosting components; checkout and order processing processes are business logic components; caching and queues are middleware services; and finally, SQL server is a data service.

Second, the application requirements span different aspects of the application life cycle—development, deployment, runtime, management, and monitoring. Key development requirements include: tools and frameworks for definition of an end-to-end application model, rapid development and/or composition of application components, and support for application customization for businesses and personalization for their users. For deployment, since composite applications are inherently distributed, it must be possible to deploy the application components across multiple servers/ services and across tiers, integrating with pre-existing applications. As many of the composite application components are stateful, the underlying runtime must provide efficient state management. Finally, once deployed, all of the composite application components must be configurable and manageable consistently as a whole.

Cloud Computing Overview

Advances in commodity hardware, virtualization, and virtual server farms have paved way for "cloud" computing platforms. Resource virtualization in cloud platforms provides higher infrastructure efficiencies. Cloud platforms allow elastic resource utilization and avoid overcapacity by providing on-demand provisioning of resources. Cloud platforms provide on-demand access to near unlimited compute and storage capacity. For example, an application may request initial compute, storage, and network capacity and then can elastically scale up or down as needed. WINDOWS AZURE™ from Microsoft Corporation is an example of a cloud platform providing an elastic compute environment, storage services, and application hosting capabilities. Cloud platforms may allow applications to start new virtual machines (VMs) or to shut down running VMs on-demand to meet current needs.

The cloud platform has caused a shift from applications as packaged software to applications or application components as services. The cloud platform technology enables: Service Oriented Architecture (SOA)-based application architecture with scale and availability; access to multiple data and application sources; deployment flexibility; and on-premises and cloud symmetry. The shift to applications and application components as services also promotes a SLA-based application behavior in which applications specify their performance, scalability, and availability requirements using SLAs rather than in terms of physical resources. These benefits are expected to compel many applications to shift to cloud technologies so that more applications will be delivered as services. Application and middleware services may be offered as autonomous services, and composite applications may be offered as a loose federation of these application and middleware services. The application components may be mapped to provisioned services. In addition to pre-defined middleware services, such as caching and messaging, user-developed applications may also be provisioned as services. Components are exposed as services, and composite applications become a composition of these services.

Virtualization technology provides a multi-tenant operating system (OS) environment by virtualizing hardware. Multiple applications may be run independently on a single core by running multiple VMs on a processor core. When applications use higher density multi-tenancy, deployment costs can be minimized. Application platforms provide another level of multi-tenancy by allowing multiple applications to run concurrently on a single VM. Even higher levels of multi-tenancy are possible if applications are architected to support multiple customers sharing the application execution environment concurrently. Such high density multi-tenancy may require the underlying storage systems, such as a Database Management System (DBMS), to be multi-tenant. Accordingly, a customer may gain significant cost savings when multi-tenancy is supported across the whole application stack, including the OS, DBMS, and application platform.

The cloud is ubiquitous and cloud (web) APIs make it accessible from anywhere. This positions the cloud as a hub or broker for a variety of clients—devices, users, businesses, applications, etc. Devices can connect to the cloud to access data; users to communicate; businesses (e.g. buyers and sellers) to negotiate; or applications to integrate. Such ubiquitous connectivity enables applications to be connected applications. A cloud platform can be an ideal platform for supporting traditional EAI (Enterprise Application Integration) and B2B exchanges.

FIG. 1 illustrates the layering of services in an application stack 100 according to one embodiment. Infrastructure as a Service (IaaS) layer 101 virtualizes hardware and OS using, for example, appliance, server, and cloud platforms. In one embodiment, IaaS layer 101 provides an elastic compute fabric on Azure Fabric, Windows server farms, and the WINDOWS AZURE™ public cloud.

Platform as a Service (PaaS) layer 102 virtualizes data and middleware components. PaaS layer 102 may comprise a service for web components, a middleware service as described herein, and a SQL server for data services. In one embodiment, PaaS layer 102 includes a WINDOWS AZURE™ platform with Azure services and its service model. Additionally, a stateful fabric may provide platform scalability and availability for state management, and SQL AZURE™ may provide database as a service in PaaS layer 102 in other embodiments.

Software as a Service (SaaS) layer 103 virtualizes application components for end users. Composite applications, such as Enterprise Resource Planning (ERP), Customer Relationship Management (CRM), content management, and collaboration services, are deployed in SaaS layer 103 as application services. For example, in one embodiment, SHAREPOINT® and MICROSOFT DYNAMICS® may be deployed in SaaS layer 103.

A next generation middleware platform in the PaaS layer provides a framework and middleware services for developing, deploying and managing composite applications. The next generation middleware platform may be developed and deployed on-premises, on the cloud, or in a hybrid environment. For example, the next generation middleware platform may be deployed in some embodiments on WINDOWS SERVER® and/or WINDOWS AZURE™. The middleware platform includes a rich collection of middleware services, an application model for composing the services into a composite application, a container to host the composition logic, and unified lifecycle management of the composite application and its constituent services.

Figure 2:
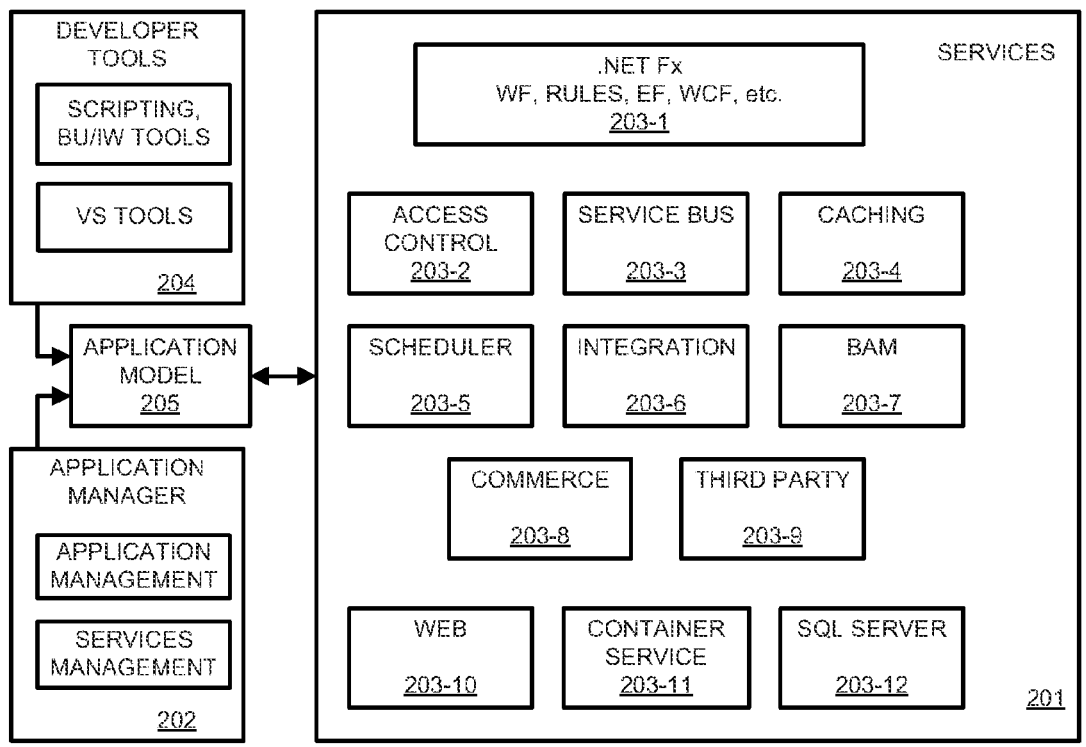
FIG. 2 illustrates the middleware platform architecture, which can be divided into a collection of middleware Services and an Application Manager.

FIG. 2 illustrates the middleware platform architecture, which can be divided into a collection 201 of middleware Services 203, an Application Manager 202, and a set of developer tools 204. The middleware platform provides end-to-end management of the services 201 and the applications that compose the individual services 203.

Developer Tools:

The Developer Tools 204 provide a development and management environment for next generation middleware applications. Applications are authored using a declarative Application Model that describes the services, application logic, and the composition between them. Developer Tools 204 are used to author services, compose services into a composite application, and to debug the services and composite application. In one embodiment, the Developer Tools 204 may be a Rapid Application Development (RAD) style VISUAL STUDIO® (VS)-based developer experience. The Application Model 205 combines the respective application models of the services that constitute the composite application.

Application Manager:

The Application Manager 202 provides runtime artifacts to support composition of services. When the application is deployed, the Application Manger 202 distributes and deploys the application models and the associated artifacts of the individual components of the application to the underlying service endpoints. In other embodiments, the Application Manger 202 may also compose other services including web, database, Azure services, SHAREPOINT®, and other external services, such as mapping services, NETFLIX®, etc., in addition to the middleware services.

In an example embodiment, services 201 are combined to provide an online shopping composite application. In the online shopping application, web components such as a shopping cart are ASP.NET components that are deployed to the Web role 203-10; checkout and order processing workflow components are deployed to a Container Service 203-11; order queues are provisioned in a service bus 203-3; named caches for the shopping cart and a catalog may be provisioned in a caching service 203-4.

Once deployed, the Application Manager 202 provides end-to-end management of the deployed services as a single composite application. Management of the services includes operations such as configuration, control, monitoring, etc. These management operations are supported on the whole application rather than just on each of the individual components. Such management is referred to herein as "N as 1 management."

The Application Manager 202 also provides management of individual services both when used in composite applications and when used independently outside a middleware platform composite application. For example, an ASP.NET web application may dynamically provision a named cache or a queue at runtime or provision caches and queues that are shared across multiple applications. Application Manager 202 manages these artifacts consistently and in a unified manner. Application Manager 202 provides support for the end-to-end lifecycle of the services and their compositions.

The Next Generation Middleware Services include a rich collection of middleware services such as caching, messaging, access control, commerce, and container services for rapid development of rich, scalable, and available applications. The rich collection of Next Generation Middleware Services allows developers to focus on application logic development rather than on building a middleware service itself. The Container Services may host Windows Communication Foundation (WCF), Windows Workflow Foundation (WF), rules, or other services. In one embodiment, the composite applications, which compose other services, include custom application logic. However, it may be necessary to deploy, execute, and manage the custom application logic at scale.

Container Service

A Container Service is available in the next generation middleware platform for hosting application logic. The application logic can be custom native or managed code or code that uses .NET framework components such as WCF, WF, rules, etc. The Container Service supports service endpoints and service reference to enable service composition. The platform also provides support for provisioning, deployment, and management of services. In one embodiment, the Container Service is layered on a stateful fabric for running application logic at scale with high availability. A stateful fabric or a similar platform may provide, for example, distributed components for scalability, availability, and application life cycle management.

The Container Service enables the development, deployment, and management of elastically scalable and available applications. A managed runtime provides a managed process host, managed programming model for stateless and stateful services, logical service endpoints and references for composing services, multi-tenancy, sandboxing support, metering, and resource control. A process instance that includes the managed runtime is referred to as a Container process. The Container Service is a cluster of container processes. In one embodiment, the container processes may be supported by stateful fabric components. The Container Service also includes components for application management.

Figure 3:
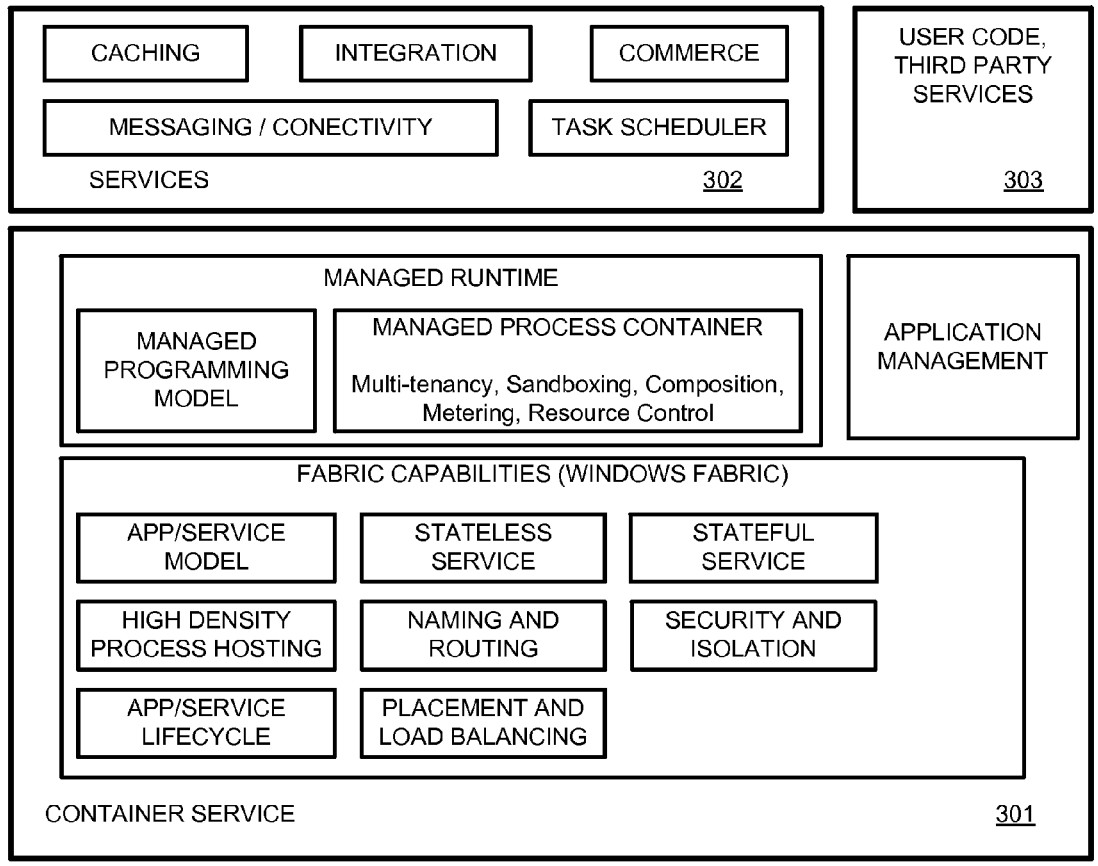
FIG. 3 illustrates the components of a Container Service according to one embodiment.

FIG. 3 illustrates the components of the Container Service 301 according to one embodiment. The Container Service 301 is the host for user code, middleware services and third party services. Container Service 301 host middleware services 301, such as caching, integration, messaging, connectivity, commerce, task scheduling or other Next Generation Middleware Services. Container Service 301 may also host third party services, custom application logic, and user code 303. The Container Service provides the following capabilities:

Scale-Out and High Availability Application Hosting.

Most stateful services—whether middleware or application components—require support for scalable and available state management. Instead of every service implementing its own scale-out and availability mechanisms, the scale-out and high availability functionality is factored into the container so that any stateful component running in the container can avail of these capabilities. In one embodiment, Container Service 301 may leverage a stateful fabric to provide scale and availability.

Address Resolution and Routing.

In a distributed, elastically scaled out system, the services may be dynamically placed or dynamically reconfigured. In such environments, the container provides support for mapping logical service names to physical endpoints of services, and efficiently routing of requests to the services. In one embodiment, Container Service 301 leverages a name resolution application to the support of services address resolution and routing.

Managed Runtime.

Container Service 301 manages the lifecycle of a service including the loading, unloading, starting, and stopping of components. The Container Service also supports configurations such as auto-start and on-demand activation of components, and provides support for setting and modifying component configurations dynamically.

Sandboxing and Multi-Tenancy.

A key feature of the container is the ability to support high-density and multi-tenancy. Depending on the isolation and security SLAs, the Container Service 301 may support VM, process, and application-domain level tenant isolation. Multi-tenancy constitutes tenant-level resource management and administration of the hosted components. The Container Service 301 captures and propagates the tenant context to all the application and middleware components. The Container Service may leverage the underlying platform multi-tenancy capabilities, such as tenant-based metering and billing.

In one embodiment, a stateful fabric or a similar platform is a component of the Container Service. A stateful fabric provides a distributed systems platform that makes it easy to develop scalable, reliable (i.e. always available), easily manageable services and applications that can be deployed on-premises and/or cloud.

Four categories of services can be composed into an application:

Stateless. These services either have no state or externalize their state to non-local persistent storage. Stateless services support multi-instance execution.

Stateless-partitioned. These are stateless services that partition their execution into subsets for load-balanced execution.

Stateful. These services have state and achieve reliability through replication among multiple replicas. One replica is designated leader and responds to client requests.

Stateful-partitioned. These services are stateful and partition state into subsets for load-balanced execution.

Additionally, services may be designated as a hard state or a soft state. Hard state is irrecoverable and cannot guarantee consistency when more than one actor acts on it simultaneously. Soft state permits more than one actor to act on it simultaneously without losing consistency, is recoverable, and can be cached.

A stateless service by definition has no hard state associated with it. However, it may maintain soft state. The stateless service's reliability requirement comes from the need for N instances of the service running in the cluster. If an instance of the stateless service goes down, such as due to the failure of the node on which the instance is running, the Container Service starts another instance of it on an another node. The Container Service quickly detects failures to ensure that at least N instances of the service are always running. The Container Service may allow slightly more than N instances to run for brief periods of time for reconfiguration efficiency.

A stateful service by definition has a hard state associated with the service that needs to be made reliable. The Container Service makes the state highly reliable by maintaining multiple replicas for the service on different nodes in the cluster. At any given time, the Container Service designates only one replica as the primary replica and replicates state changes made by the primary replica to the secondary replicas. By ensuring that the number of replicas closely mirrors a desired replication factor, the Container Service guarantees reliability of stateful services.

Regardless of whether the service is stateless or stateful, an application administrator may decide to partition the service. A partitioned service divides its state, and the access patterns to that state, across nodes in the cluster deliver improved throughput. Since partitioning is an administration time decision, service must be designed to such that partitioning will not cause errors.

Manifests.

Service Manifest captures service metadata such as service type, health properties, pertinent load balancing metrics, and the service binaries and configuration files. Application Manifest captures service composition metadata such as stable names, partitioning scheme, instance count/replication factor, security/isolation policy, placement constraints, configuration overrides, and service types of constituent services and the load balancing domains into which they are placed. Cluster Manifest captures physical infrastructure metadata such as machine names, machine types and their description, network topology, upgrade domains, etc. Manifests may be schematized XML documents that are either be written by the developer or tool generated.

Figure 4:
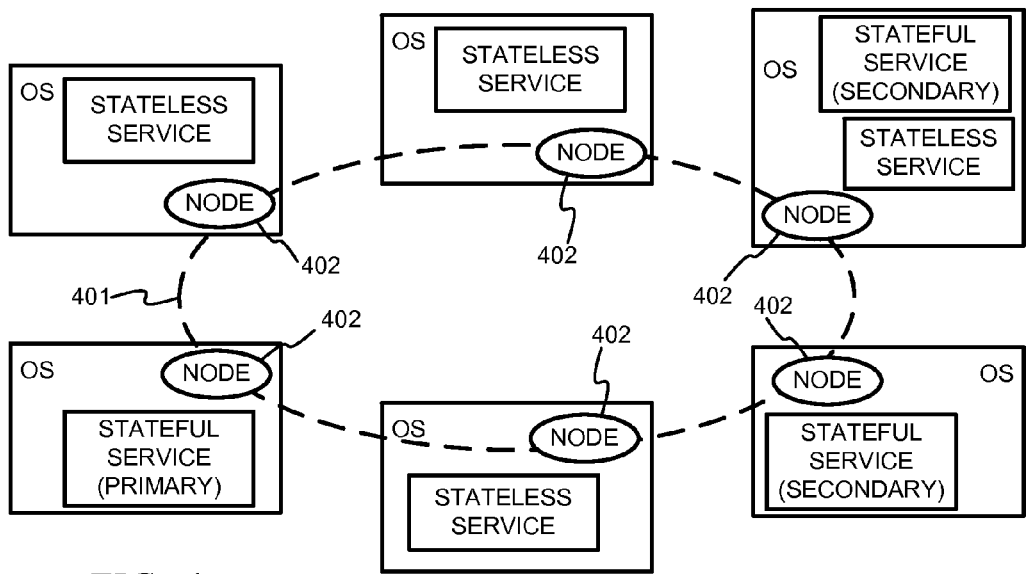
FIG. 4 illustrates a ring hosting stateful and stateless services according to one embodiment.

FIG. 4 illustrates a ring hosting stateful and stateless services according to one embodiment. To support the execution of the stateful and stateless services, the Container Service ships a runtime that creates a federated ring 401 among the nodes 402 on which it executes. In one embodiment, the applications may use stateful fabric runtime APIs to gain reliability, achieve scalability, and become easily manageable. The applications are insulated from underlying physical infrastructure differences.

The nodes 402 are generally host operating systems running on physical hardware, though they can also be hosted in virtual machines. In order to satisfy the reliability requirements of stateful services, systems on which stateful services are placed must not share a common single-point of failure. The decentralized architecture of the Container Service provides the following services:

High Density Deployment and Activation.

The Container Service analyzes the application manifest to determine which services compose the application. The Container Service performs service placement based on load, locality, service/application specified placement constraints, failure/upgrade domains, etc. Placement constraints may include, for example, certain types of nodes or a minimum SLA guarantee. Services are placed on a pool of hardware shared by many applications.

Security and Isolation.

Using the point-to-point communications network on ring 401, the Container Service reliably deploys and activates the services under application-specified security principals and/or process isolation on the target nodes 402.

Name Resolution.

The Container Service provides name resolution for both internal and external service lookup. Name resolution transparently maps a service name to the primary service replica in the case of a stateful service, or a load-balanced service instance in the case of a stateless service.

Inter-Service Communication.

The Container Service creates a communications substrate over which services can reliably communicate with one another.

Reliable Reconfiguration.

The Container Service monitors the health of all nodes and all services running in the node. If a stateful replica/stateless instance fails, such as due to the failure of the underlying node, the Container Service assigns the failed service replica/instance to another healthy node. Similarly, the Container Service restarts failed persisted stateful service replicas on recovering nodes.

State Replication.

For stateful services, the Container Service provides state replication triggered by primary replica as part of processing incoming client request between primary and secondary replicas including quorum and failure management.

Load Balancing.

The Container Service load balances services, both stateless and stateful, across the underlying shared pool of nodes 402 to achieve uniform load distribution on a set of predefined load metrics.

Lifecycle Management.

A Container Service management subsystem manages the full lifecycle, including provisioning, deployment, monitoring, and servicing/patching, of applications. The Container Service c guarantees application reliability when deploying application/OS patches and provides strict version guarantees to effectively version protocols and upgrades.

The Container Service interfaces with external mechanisms, such as AutoPilot, WINDOWS AZURE™, and System Center, for the provisioning and configuration of the host operating system, as well as the installation of the components that form the ring 401.

A comprehensive and symmetric distributed (on-premises and/or cloud) systems application platform, such as a stateful fabric in one embodiment, with both programmatic and runtime aspects that manage the entire lifecycle of applications provides the capabilities needed to support the Container Service. Such a platform supports applications running at a high density on a shared pool of hardware. The platform isolates the applications from each other and provides the benefits of scalability, reliability, and self-healing manageability while insulating the applications from the differences in the underlying physical environment (on-premise and/or cloud).

Web Container

The Container Service enables stateful, scalable, middleware application components and services. Most applications, however, span tiers and include web components. For example, an online shopping application might include web components such as catalog, shopping cart, order status, etc. These components may run in the web tier in an IIS/ASP.NET host or in a cloud web role. Such a host/role is referred to herein as a Web Container. Most composite applications require both a Web Container and a middleware Container Service.

Referring again to FIG. 2, Web Container 203-10 and Container Service 203-11 are illustrated in the next generation middleware services architecture as part of the application services 201. Architecturally, the Web Container 203-10 is a peer of the Container Service 203-11. The Web Container 203-10 hosts user-facing web artifacts such as web pages and ASP.NET artifacts that generally support stateless request/response interactions. Web Container 203-10 by itself does not manage state. Even when state exists, applications typically manage their state by externalizing the state to a store or a cache, thereby making Web Container 203-10 state-free. Since the Web Container 203-10 is state-free by design, the hosted web application can be scaled by hosting the Web Container on a farm of IIS/ASP.NET servers and by using a load balancer such as Application Request Routing (ARR) to distribute the web application across the Web Containers. Besides the differences in the request interaction patterns, the comparison of stateless versus stateful application hosting differentiates the Web Container from the middleware Container Service.

In one embodiment, the Web Container layers on WINDOWS SERVER®/WINDOWS AZURE™ and can directly consume any service, including middleware services, available on the server and/or on Azure. For example, on WINDOWS AZURE™, web components, such as a shopping cart running in the Web Container, may directly access the SQL AZURE™, cache, and messaging services. However, such access to these services is typically hardwired in the application code and the aspect of composition of different services is not visible outside the application code. This lack of composition information creates a "1 as N" problem. That is, managing one web application requires management of N services accessed by the application. By including the composition related assemblies in the Web Container, the web application can avail of the benefits of composition and provide end-to-end (i.e. N-as-1) management of the application and its services. Using the Composition Model to build the composite application enables the end-to-end management of the application, along with other benefits such as dynamic service composition and cross-cutting aspect (e.g. metering, throttling) management.

Application Model

The Application Model enables Independent Software Vendors (ISV) and developers to author stateful and stateless services and web components. The Application Model further enables application developers to compose the services and components into applications. The Application Model captures the runtime consumable description of an entire distributed application, which includes services and components running in all application tiers—client/browser, web, midtier, and database—including the tiers that may not be written using a stateful fabric. Additionally, the Application Model allows for modeling compositional relationships among services and web components in an explicit manner.

In one embodiment, the Application Model, which is a runtime consumable description of the composite application, is layered on top of:
 1. An Application Model for stateless and stateful services.
 2. A cloud service model for IIS hosted web services/applications.

A serialized textual representation of an instance of the Application Model is referred to as an Application Manifest. In one embodiment, both JSON and XML formats are supported for the Application Manifest.

Figure 5:
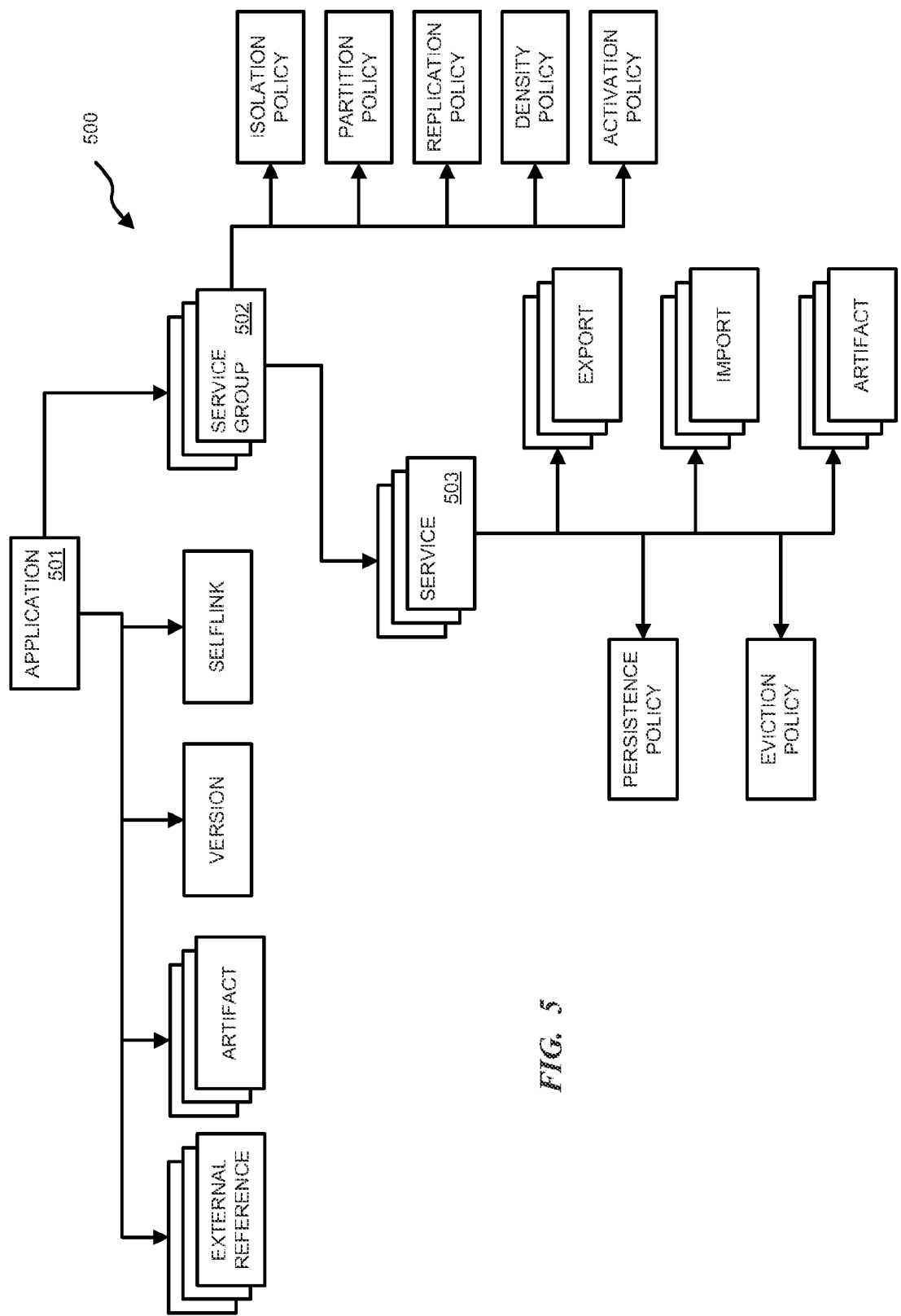
FIG. 5 illustrates an Application Manifest, including the core elements of an Application Model.

FIG. 5 illustrates an Application Manifest 500, including the core elements of an Application Model. In one embodiment, the Application Manifest 500 maps to the Azure service model definition (.csdef) for IIS/web role hosted services and to the stateful fabric application/service manifest for stateless and stateful services respectively. For the stateless and stateful services inside a middleware platform composite application, the Application Model extends the application model for stateless and stateful services using standard application/service model extensibility mechanisms.

The Application Manifest 500 defines a number of external references and artifacts. The Application Manifest may also track versioning and selflink. The Application Manifest identifies one or more service groups 502 that make up the application 501. Each service group may be associated with one or more policies, such as an isolation, partition, replication, density, and activation policies. Each service group 502 is associated with one or more services 503. Each service 503 may be associated with policies, such as a persistence policy and an eviction policy. Each service 503 may also define export, import, and artifact parameters.

Figure 6:
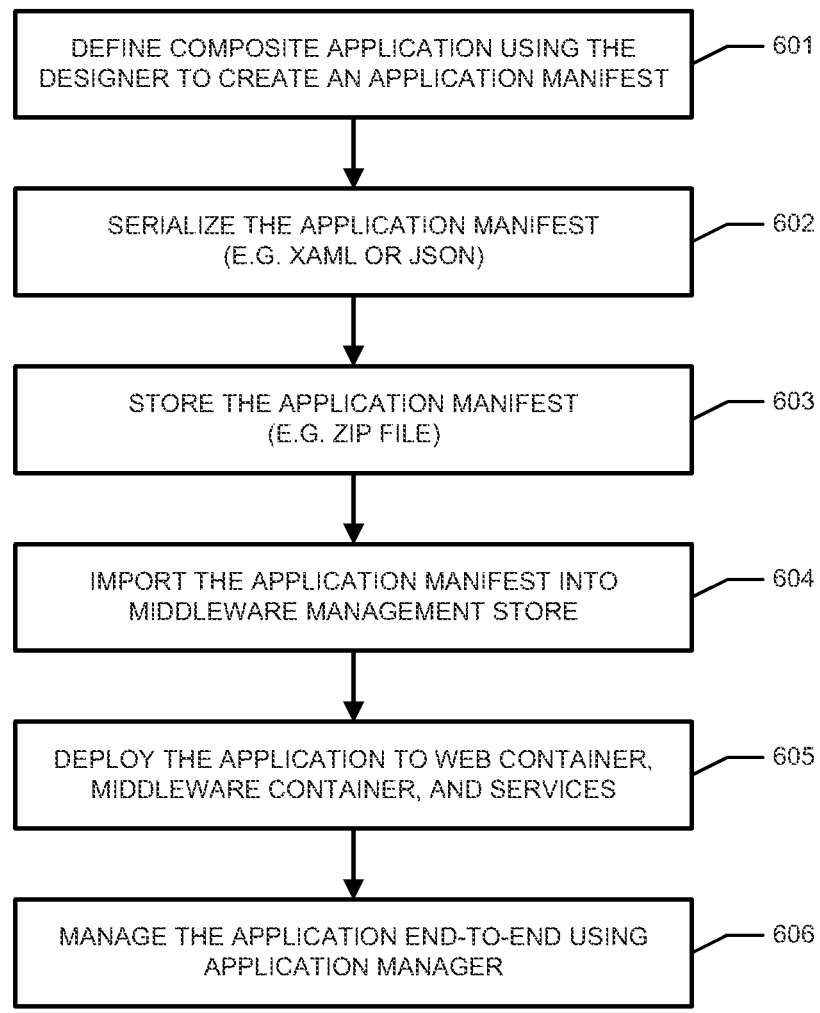
FIG. 6 illustrates the end-to-end flow of middleware platform application development and deployment.

FIG. 6 illustrates the end-to-end flow of middleware platform application development and deployment. In step 601, a developer defines the composite application using the Application Model and uses the designer to create an Application Manifest for the composite application, which includes the service definitions and relationships between them. For example, in an online shopping application example, the Application Model defines the ASP.NET (with shopping cart, catalog browse, etc.), checkout (stateful WF), caching (for product catalog), order processing logic (stateful WF), and the database components and defines the relationships and/or dependencies between the components. In step 602, the description is serialized in XAML or JSON, for example, and stored in step 603 as application manifest in a .ZIP or similar file.

In step 604, the Application Manifest is imported into a middleware management store. The management store provides REpresentational State Transfer (REST) APIs for manipulating the application description. These REST APIs can be used to modify and configure the application description. The imported application may then be deployed to Web Containers, Container Service, other Services, and external services in step 605. Once deployed, the application is managed end-to-end with Application Manager in step 606.

Service Model

Figure 7:
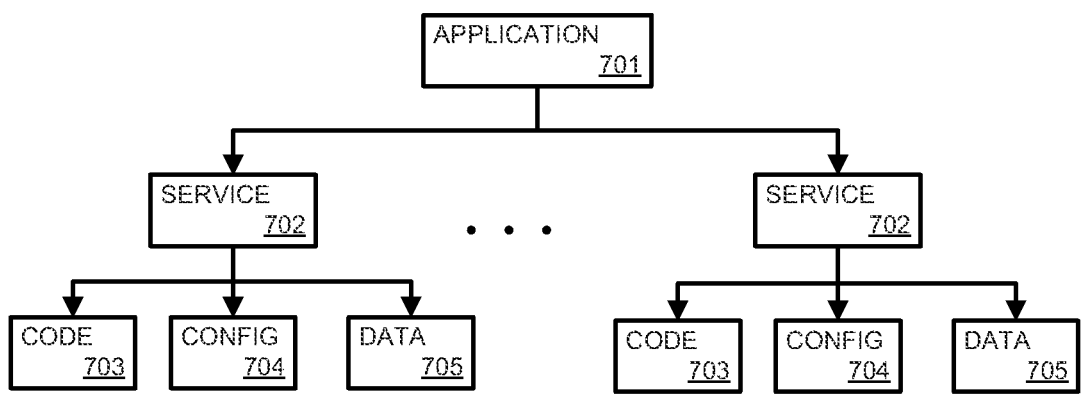
FIG. 7 illustrates an application Service Model according to one embodiment.

FIG. 7 illustrates an application Service Model 700 according to one embodiment. An application 701 is a composition of services 702. Each service 702 consists of code 703, configuration 704, and data 705 packages that implement the functionality of that particular service.

The Service Model 700 is a systematic and declarative way of describing an application so that the middleware platform can provision, deploy, monitor, and service the application. The Service Model is a collection of declarative schematized manifest files that are used to describe an application lifecycle from development, provisioning, deployment, monitoring, and servicing/patching the application. The Service Model is designed around different roles involved in building an application and expresses the application development, provisioning, deployment configuration, and servicing aspects of the application. The Service Model allows application/services to be reused and reconfigured to meet different deployment needs.

Service Manifest

A Service Manifest specifies the load balancing metrics reported by service replicas/instances that the middleware platform uses for balancing the load across the nodes in the cluster. The Service Manifest also specifies the health properties and alerts service replicas and instances to periodically emit into event tracing, which the middleware platform watches and collects into a central store to provide a near real-time snapshot of services health. In addition, the Service Manifest declares trace filters to be used by the middleware platform to filter traces emitted by the service replicas/instances for aggregation into operational stores for gaining operational insight, perform root-cause analysis, and deliver usage based billing. In one embodiment, the Service Manifest is a strictly-versioned schematized XML document authored by a service developer to describe the provisioning and deployment package for a set of service types. The Service Manifest specifies independently upgradable units of code, configuration, and data packages that together implement specified set of service types.

The Application Manifest specifies (1) a set of static services that must be created when instantiating an application and (2) a set of permitted types of services that can be created dynamically inside an application. The Application Manifest also provides default configuration values, such as replication factor that are used by the middleware platform when an application dynamically creates a service of a permitted service type. In one embodiment, the Application Manifest is a strictly-versioned schematized XML document authored by an application developer to describe the provisioning and deployment package of an application type. The Application Manifest references the Service Manifests for the services from which the application is composed and, as needed, overrides configuration settings of the constituent services after appropriately parameterizing different application settings to define an application type.

N-as-1 Application Management

Composite applications are inherently multi-tier, multi-technology, and multi-component/service. Accordingly, to reduce costs and complexity, it is useful to view and manage the entire composite application as a single unit through the lifecycle of the application. For example, it is helpful to define the boundary of the composite application and its N components across the web-tier (i.e. ASP.NET and WCF), middleware services tier (i.e. caching and messaging), middle-tier/business process tier (i.e. workflow, integration), and data-tier (DBs) so that the application can be viewed as one entity for performing the following management operations:

1. Deployment (first-time, upgrades, versioning, etc.);
2. Configuration (of entire application and individual components and services);
3. Control (start, stop, pause, throttle, etc.);
4. Monitoring (events, state, health and performance SLAs);
5. Troubleshooting (diagnostics and debugging);
6. Reporting (usage, metering, billing); and
7. Optimizing (scale-out/in, fine-tuning, migration).

In terms of application lifecycle, once the application is developed and tested by the developer and is ready to get deployed, an Application Administrator (App Admin) gets the application package. The application package includes the application binaries, configuration, and composition model definition, which describes the composite application as a single unit. From that point onwards, the N-as-1 management system allows the App Admin to take over.

Figure 8:
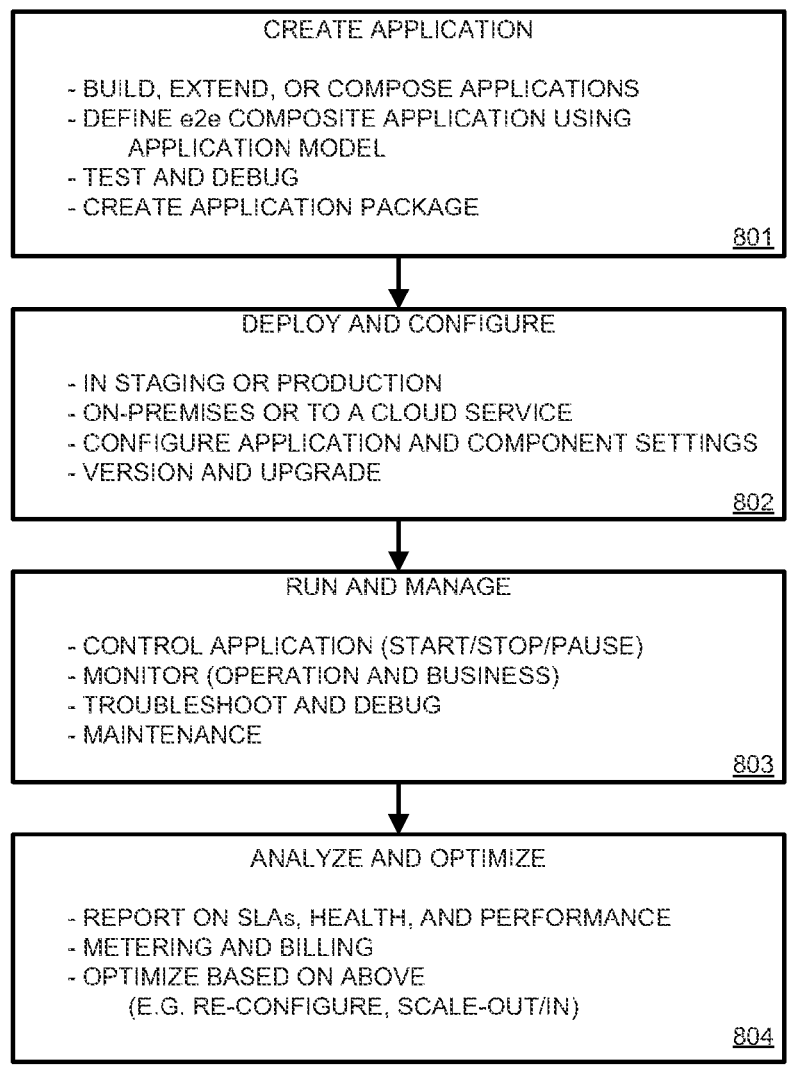
FIG. 8 illustrates the complete lifecycle of an application according to one embodiment.

FIG. 8 illustrates the complete lifecycle of an application according to one embodiment. In a first phase 801, the application is created. Creation of the application may include, for example, building, extending, or composing applications; defining an end to end composite application using the Application Model; testing and debugging; and creating an application package. In a second phase 802, the application is deployed and configured, which may include staging or production. The application may be deployed on-premises (e.g. server) or to a cloud service (e.g. Azure). Application and component settings are configured during deployment. Versioning and upgrading of the application may also be performed as part of deployment and configuration. In a third phase 803, the composite application is run and managed. During this phase, the application is controlled (i.e. allowed to Start/Stop/Pause) and monitored for operational performance and for business issues/data. Troubleshooting, debugging, and maintenance of the composite application may be performed as necessary. In a fourth phase 804, the composite application is analyzed and optimized. Reports on SLA compliance, application health and performance, and application metering and billing may be performed or monitored. The composite application may be optimized based on these factors. The optimization may include, for example, reconfiguration and/or scale-out/in of the composite application.

If the N-as-1 Management Model is not used, then the cost and complexity of managing individual components and services across various tiers of a distributed, scaled-out, stateful composite application would become prohibitive. The N-as-1 Management Model allows App Admins to manage applications without needing to be intimately familiar with the detailed working of the applications. In the dynamic world of services, it is difficult to manage one component without impacting the performance, health, SLA, or cost of other related components.

The N-as-1 Management Model of the next generation middleware platform leverages the composition model definition to understand the services that make up the application and the services' components, the desired deployment topology, the external communication endpoints, and the control flow among the application components. The N-as-1 Management Model provides an end to end view of the distributed composite application so that the application can be managed through its lifecycle as a single entity. The in-depth understanding of the services and their components differentiates the N-as-1 Management Model from system management solutions. In one embodiment, the N-as-1 Management Model layers on top of the systems management model, such as System Model or Azure, to provide a very rich and application-behavior-specific management of the entire application and individual components.

Next Generation Middleware Services

The Composition Model and the Container Service enable the development, deployment, and management of Next Generation Middleware Services that may be either stateful or stateless. In one embodiment, the middleware platform provides several out-of-the-box middleware services, including caching, messaging, and the like, that enable rich application development. These middleware services are stateful and leverage the capabilities of the middleware platform. These middleware services are developed using the Composition Model, deployed in the Container Service, and managed using the N-as-1 Management Model. These Services are characterized by the following capabilities, which are inherited from the Container Service and the Composition Model:

- Multi-tenant middleware services deployed on-premises, on the cloud, or in a hybrid environment, such as WINDOWS AZURE™ and WINDOWS SERVER®;
- Layered on a cloud Service Model, such as the WINDOWS AZURE™ service model;
- Built using common middleware Container Service and Composition Model;
- For every middleware Service, common infrastructure enables cross-cutting monitoring, throttling, metering, and billing;
- Participate in rich composition for building composite applications that provide for end-to-end monitoring and management of the service and the application composing the services;
- Mostly stateful services;
- Multi-tenant service; and
- Applications can access the services using a cloud (e.g. Azure) Service Model via REST or .NET clients, or using a Composition Model for higher-level benefits.

Referring to FIG. 2, out-of-the-box Next Generation Middleware Services include, for example, Caching 203-4, Service Bus 203-2 which supports connectivity, queues, and pub/sub), Integration 203-6 which supports transforms, pipelines, and adapters, BAM (Business Analytics Monitoring) 203-7, Commerce 203-8, and Container 203-11 which supports workflow, rules, WCF, etc.

Middleware Caching

Distributed applications require support for a large number of users, and high performance, throughput, and response time. Composite applications are composing data and business logic (for example, mashups) from sources that can be local, federated, or cloud-based. Composite applications require aggregated data to be shaped in a form that is most suitable for the application. Caches often provide a store for holding the aggregated application data.

Figure 9:
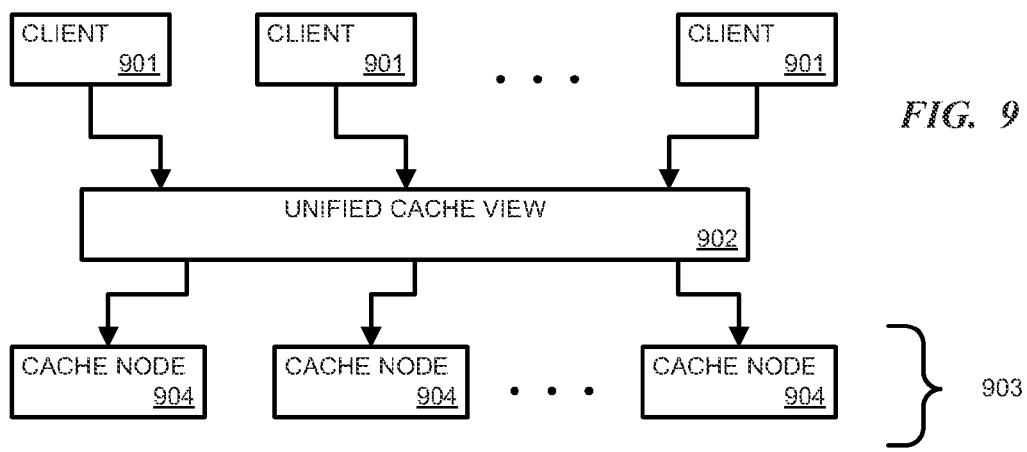
FIG. 9 illustrates the distributed cache concept used in the Middleware Platform.

FIG. 9 illustrates the distributed cache concept used in the Middleware Platform. Clients 901a-n are spread across a number of machines or processes. The clients 901a-n access Cache 902 as if it was a large single cache. A cache layer 903 distributes data across various cache nodes 904a-m.

Middleware Caching provides .NET applications with high-speed access, scale, and high availability to application data. It is an explicit, distributed, in-memory application cache for all kinds of data (CLR objects, rows, XML, binary data, etc.). As shown FIG. 9, the Middleware Cache combines memory in each node 904, which may be a virtual or physical machine, in a node farm 903 into a unified cache 902. Any data on any node 904 can be accessed by any client 901. Cache nodes 904 in the distributed cache map to Containers. The benefits of caching depend on the type of data that is cached. Middleware Caching may categorize data into Reference data, Activity data, and Resource data.

Reference Data.

Reference data is a version of the authoritative data. It is either a direct copy or version of the original data or data that is aggregated and transformed from multiple data sources. Referenced data does not change often. It is refreshed periodically, usually at configured intervals, from its sources, or refreshed when the authoritative data sources change. Access to reference data is high shared, but it is mostly read.

Activity Data.

Activity data is generated by the currently executing activity as part of a business transaction. The activity data originates as part of the business transaction and, at the close of the business transaction, the data is retired to the data source as historical or log information. Activity Data is also known as Session data, wherein it is the data that is exclusively used by the session.

Resource Data.

Both reference (e.g. shared read) and activity (e.g. exclusive write) data are ideal for caching, but not all application data falls into these two categories. Product inventory is a good example of such data. It is shared; concurrently read and written; and accessed by large number of users. Such data is known as the resource data. Distributed caches provide varied mechanisms for providing scalable and available access to such resource data.

Scale.

As with scaled-out databases, Caches may be partitioned and distributed to different nodes, such as the Middleware Containers. As application write items (application objects), the Caches are mapped to partitions for physical placement. Caching provides transparent placement and load balancing of partitions across the collection of Containers. The Container also provides mechanisms for routing cache access requests, such as Get and Put, to the appropriate cache partition, which may be a Container hosting the partition. This is achieved by maintaining a routing table that maps cache items to the correct cache container. When a new cache container is added, the Container mechanisms reconfigure the partition placement to balance the load across the containers. The routing table is appropriately updated to reflect the correct mapping of cache items to cache partitions/containers.

Availability.

To support high availability, the Container provides supports for replicating cache partitions to other containers. One partition is designated as a primary partition, and that partition can be redundantly replicated to one or more copies, known as secondaries. Every Cache put is propagated to the secondaries and the middleware platform supports quorum-based protocols for efficient replication.

When a primary cache partition, such as a Container) fails, the middleware platform mechanisms automatically allow fail-over to an elected secondary, thereby allowing continued access to the cached data. A Get operation behaves the same way as it does in a partitioned cache without secondaries; the operation gets routed to the appropriate primary partition.

Local Cache.

Applications may also maintain a local cache in the application process space for frequently accessed items. In the local cache, items are kept in the object form to help applications save the deserialization cost as well as the network hop to the primary computer, thereby resulting in increased performance. In one embodiment, Caching provides mechanisms, using expiration timers and notifications, for refreshing local caches when cache items are changed.

Middleware Messaging and Connectivity (Service Bus)

Messaging is a communication style that allows senders/producers to communicate with receivers/consumers using messages. Connectivity refers to the ability to allow services to connect and be notified across trust boundaries through various messaging protocols. Together Messaging and Connectivity enable distributed and disconnected applications that communicate amongst themselves through a variety of protocols such as REST, SOAP, SMTP, SMS, and AMQP. Messaging and Connectivity enable:

- Connecting distributed Application Components through the use of relays and notifications. This may be a direct or synchronous communication where the end points are expected to be alive to receive the message.

Temporally disconnecting Application Components through brokering the communication using volatile or durable queues and publish-subscribe mechanisms. This may be an asynchronous communication pattern in which the senders and receivers are temporally disconnected and may be unaware of each other.

Middleware Service Bus is a messaging bus that offers messaging and connectivity services to enable the building of distributed and temporally decoupled services. The Service Bus provides the varied routing, exchange and delivery patterns that are required of a messaging bus.

Connectivity Scenario.

The connectivity feature is analogous to the telephony system that offers direct connection between the caller and the callee. Both need to be online for them to communicate. The telephone network acts as the intermediary in routing and connecting the two parties involved. While traditional phone lines offer duplex voice, push to talk feature on cellular phones allow for half-duplex communication that allows request-reply semantics. As in these real world scenarios, Service Bus acts as the intermediary that connects the client and server and allows them to communicate using one of following message exchange patterns.

One-way: In this pattern, the sender sends a message and does not expect a response message from the consumer;

Request/Reply: Sender sends a message and expects a response from the receiver for each request; and Duplex: Sender and receiver communicate with each other simultaneously over a shared communication channel.

These message exchange patterns over a synchronous connection medium allow for regular WCF-style services to be exposed over the web easily. Message properties, such as transactions, security, etc., flow directly to the target service.

When exposing internal applications over the Internet, security becomes a key consideration. Service Bus integrates with the ACS (Access Control Service) to secure the endpoints. Access Control allows federating the authorization using claims. With its support for a simple declarative model of rules and claims, Access Control rules can easily and flexibly be configured to cover a variety of security needs and different identity-management infrastructures.

Messaging (Decoupled Communication) Scenarios.

The connectivity feature requires the server and client to be both online at the same time to send and receive messages. This is not suitable for HTTP-style communications, where the requests are not typically long lived, nor for occasionally connected clients, such as browsers, mobile applications, etc. Decoupled communication has the advantage that clients and servers can connect when needed and can also perform their operations and synchronized in a delayed fashion. In addition, the connected scenario requires use of WCF-style programming including channel bindings, which are not available for non .Net users such as Java clients, JavaScript clients, SILVERLIGHT® clients, etc.

In the real world analogy, the messaging feature maps closely to that of postal services. You can send a mail to a targeted address, to a post box, or a mass-marketing bulk mail. The postal service acts as the intermediary and provides different quality of service such as express mails, priority mails, return receipts, re-delivery, dead lettering and so on. Likewise in messaging, the Service Bus acts as the intermediary that stores and forwards the message to the recipient. The quality of service features come with certain cost and latency implications (express versus regular mail for instance). The fundamental patterns in decoupled messaging scenario are Queues and Topics/Subscriptions.

Queues offer a one-to-one form of communication. Messages are typically expected to be received by the receivers in the temporal order in which they were sent.

Topics and Subscriptions offer one-to-many form of communication. Here messages are sent to a topic which is then sent to all the subscriptions. The subscriptions can use additional filters to restrict the messages that they want to receive. Typically filters are either SQL92 expressions or LINQ based pragma expressions.

Both Queues and Subscriptions allow competing readers where only one of the readers can get the message. These entities have to deal with suspended messages and dead messages.

Delivery Assurances.

Since the server and client are not using synchronous communication, delivery guarantees allow both clients and servers trust the intermediary (Service Bus) to deliver the message to the recipient. The typical delivery guarantees expected in a messaging system are:

Exactly Once. The message is delivered to the recipient once and only once. This can be accomplished using transactions or through duplicate detection mechanisms.

At Least Once. The message is guaranteed to be delivered at least once. In a typical scenario, applications use peek-lock to lock the message without transactions and then complete the message under a transaction.

Best Effort. The messaging system tries its best to deliver the message, but there are no guarantees of delivery in the event of failures in the system.

When exchanging messages over a decoupled entity, message properties such as transactions end at the entity in the Service Bus as opposed to flowing to the target service. This pattern of programming relies on the client and server not connected temporally.

Reliability.

Reliability of the messages is a Quality of Service (QOS) that the messaging systems support. Typically, the Queues and Topics/Subscriptions are either volatile or durable. Volatile entities are useful for supporting low latency messaging with a risk of losing messages in the event of machine failures. With distributed systems, in-memory replication technologies can be used to lower the risk of single machine failures, though it adds cost in terms of network latency and extra memory used. With durable entities, the data is stored in external stores, such as SQL Server, local files or Azure table storage.

Scale.

Different dimensions of scale may need to be handled in a messaging scenario. Typical scale dimensions are:

Scale on entities. The messaging system should be able to scale on the number of queues and topics.

Scale on the size of the entity. The system should scale on the number of messages in an entity.

Scale on the number of producers/consumers. The number of producers and consumers on a queue or subscription need to be scaled.

Scale on the number of subscriptions. There may be a large number of subscriptions with complex filters that need to be evaluated efficiently.

Scale on message size. Handle large messages.

A key differentiator with the Middleware Service Bus, compared to other solutions is service-server symmetry. This allows for enterprise applications to be run on-premises or in the cloud using the same programming model and behavior. The connectivity features allow for cloud-enterprise integration, while messaging features allow for traditional enterprise messaging to be used at cloud scale. Furthermore, integrating with notification features, such as SMS, email, or FTP, and with web protocols, such as REST or Websockets, would allow bridging the gap between traditional enterprise messaging and cloud messaging.

Middleware Integration Service

The Middleware Integration Service enables integration of workloads. In one embodiment, this may be supported by re-platforming BIZTALK® components over the middleware platform. Components such as transforms, pipelines, and adapters become native middleware platform components, thereby enabling these components to be used for supporting integration workload scenarios.

Integration Services provide the capabilities needed for building Enterprise Application Integration (EAI) and Business-to-Business (B2B) solutions needed by enterprises to bridge last-mile connectivity to Line of Business (LOB) systems, support heterogeneous transports and protocols and communicate with business partners. In particular, Integration Service provides:

Adapters for LOB system and transport connectivity;
Transforms for normalizing type systems and formats;
Pipelines for enhanced messaging; and
B2B service for managing trading partners and to execute business transactions.

Adapters.

An adapter provides last-mile connectivity to LOB systems and supports connectivity multiple network protocols. The adapter infrastructure includes four key capabilities:

Push/Pull Services;
Adapter framework;
On-premise connectivity module; and
Adapters to some LOB systems and transports.

Transport adapters provide network protocol connectivity. They also include push and pull services that provide ability to poll for messages over transports like FTP, retrying send or receive of messages, batching messages before sending them in or out of the application and for streaming support.

LOB adapters allow for connectivity to LOB systems such as SAP, SQL, and Oracle. The LOB adapters normalize the connectivity between the applications and the LOB system by exposing LOB operations as WCF services. Adapters provide enhanced capabilities, such as connection pooling and LOB credential translation, thereby simplifying the process for using the adapters.

The Adapter Framework is a common underlying public framework that allows for developers to build adapters for any LOB system. The Adapter Framework provides the core ability to translate to expose LOB operations as WCF operations. In order to support that, it has a metadata translation system and a LOB connectivity management sub-system as well as a public API to be used by the adapter developer. The Adapter Framework also provides a VISUAL STUDIO® experience for adapter users to browse an LOB system and choose the operations that they want to use. These operations and related types will then be exposed as a WCF service and related .Net types.

To expose connectivity LOB systems into the cloud, an on-premise module may allow the WCF services generated from the LOB system to be exposed to applications in the cloud through Service Bus.

Middleware Transformations

Most integration applications need to transform data between different type definitions, across different type systems, and also across different data formats. The Integration Service includes a Transformation engine and related tools that make building, running and managing transformations defined as maps. The Transformation engine supports converting data between XML, .Net, ODATA and other type systems and formats and provides a uniform way of defining the needed transformations across source and destination targets. In order to support complex transformations, the Transformation engine supports "functoids"—pre-packaged and custom computations that allow for users to do translations that are more complex than simple assignments. Examples of pre-packaged functoids include: StringConcatenate and DatabaseAccess. A Script Functoid may also allow a developer to write custom code.

In one embodiment, one capability of the Transformation system is a Visual Studio based Mapper tool that allows for users to graphically define transformations. The tool provides many usability and productivity features that allow users to easily manage very complex transformations—a scenario that is very likely in EAI and B2B scenarios. Complexity here comes both in sizes of the type definitions as well as in the number of mapping lines between elements of these types. The tool also provides validation of maps so that developers can be assured that their maps will work as defined.

Middleware Pipelines

A Pipeline is a sequence of message processing functions with additional control flows with the intent purposes of bridging impedance mismatches between communicating systems, where the impedance mismatches can be structural (i.e., the structure of the object understood by the communicating systems differ), protocols, security systems, and the like. Typically, such impedances are bridged transparently and, therefore, it is essential that the pipelines participate in a way that it does not change the assurances expected by the communicating systems. You could use pipelines to implement several kinds of message mediation patterns.

A pipeline is composed of Stages where each Stage is a message processing unit with clear intent expressed as a signature containing input/output typed arguments and exceptions. A Stage is an atomic unit of execution and can contain many Activities within it. A Stage can be turned on or off depending on the pipeline. For example, a VETR pipeline containing four Stages—Validate, Extract, Transform and Route—each of which can have any number of activities contained in them and any number of these stages could also be repeated if so desired.

Pipelines solve the problem of bridging impedance mismatch. The solution used to bridge this impedance mismatch may be thought of as a normalizing pattern. The pipeline normalizes the message on behalf of one of the communicating parties. Generally, there are two broad patterns of pipelines or normalizers—Structural Normalizer and Protocol Normalizer.

Structural Normalizer.

In a structural normalizer pattern, the sender is aware of the presence of the receiver and is actually communicating with the receiver. The sender uses the same protocol as the receiver, and the sender may choose to wait for the receiver's acknowledgement. Moreover, the structural normalizer's life cycle is tied to either the sender or the receiver. The structural normalizer is a transparent entity that does the work of bridging an impedance mismatch. It may choose to do this on behalf of the receiver on the receiver's side for all senders, or on behalf of the receiver on the sender side for a specific sender.

Protocol Normalizer.

In a protocol normalizer pattern, the sender is not aware of the receiver, but instead is distinctly aware of the protocol normalizer that the sender is communicating with. The sender uses the protocol that protocol normalizer exposes on the speaker's side. The acknowledgement and assurances received by the sender are those that are provided by the protocol normalizer, not by the receiver. Moreover, the protocol normalizer's lifecycle is independent of the sender or the receiver.

Fixed Pipelines and Custom Pipelines.

Pipelines that implement a fixed pattern, such as specific templates, are called fixed pipelines. The fixed pipelines take in runtime values as configuration. For example, a VETR structural pipeline takes the schema and map as configuration to execute the pipeline. Protocol normalizers, such as EDI over AS/2 or VETR, also take as configuration schemas, transform maps and routing rules. Custom Pipelines are pipelines with a template that offers the user the capability to customize with user code in-between. An example of a custom pipeline pattern is the VETPR where P is a process step that executes user code.

Bridging the Service Bus with New Message Entities

All protocol normalizers take care of impedance mismatch between the wire and transport protocols on the one hand and the wire and transport protocols used by the Service Bus entities—Queues, Topics, and Relay endpoints. Examples of protocol mismatches are SOAP versions, EDI AS/2, on the one hand, and the wire protocol used by the Service Bus entities. Example of transport mismatches are FTP on the one hand, and HTTP/TCP used to message with Service Bus entities. This is referred to as bridging.

Two kinds of bridges are defined as additional Service Bus message entities—Inbound Bridge and Outbound Bridge.

The Inbound Bridge is one that takes as input a message over some transport and wire protocol and subsequently normalizes it to publish into the Service Bus. An example of an Inbound Bridge is an AS/2 Protocol Bridge. The Outbound Bridge is one that takes messages from Service Bus entities as input and passes it on the outside world. Examples of Outbound Bridge are SMTP Push Notification (or any kind of notification) and AS/2 message send where messages are assembled, batched and sent out. The bridges are messaging entities in equal measure as other Service Bus message entities such as Queues, Topics, Subscription, and Relay endpoints but with one key difference. While the structural normalizer pipelines that can be annotated on a Queue, Topic, Subscription or a Relay endpoint, no such annotation is possible on the bridges, for the bridge is essentially configured with a normalizer pipeline—structural or protocol.

Integration Service simplifies the development of integration applications by providing common integration patterns as configurable entities that are managed and run by a public multi-tenant capability of the Service Bus. This allows for developers and IT to delegate the responsibility of scale, versioning and other management for these common integration needs to the service.

For scenarios where developers have to build custom integration pipelines, integration must be provided with Composite Application model and experience. These pipelines may be deployed, managed and run as part of the user's composite application.

B2B Service

A key part of integration scenarios is the ability to do business-level transactions with trading partners. Usually, these transactions occur over standardized business-to-business protocols such as EDI, SWIFT, HIPAA, HL7 and the like. A key aspect of building a B2B integration application involves managing business partner settings that need to be used in the transaction processing. For large companies, managing the technical partner agreements is the most expensive part of the application lifecycle management process. In order to facilitate and simplify B2B transactions, Integration Service provides a B2B service that includes:

Trading Partner Management (TPM) portal; and
EDI pipeline on which business transactions are executed.
TPM Portal.

The TPM portal provides a common experience and data model for storing technical partner agreements that can be used by EDI and other specific B2B protocols. Partner onboarding is made simple and automated through a set of agreement negotiation workflows that guide the user through the technical settings. Once the settings are submitted, the partner on the other side can negotiate changes in how the settings are interpreted or used. Once the agreement negotiation is complete, the agreement is stored in the TPM repository and is available to be applied for running transactions. The partner can also through the portal deploy the EDI processing pipeline that applies the settings in the agreement for all their transactions. The portal is also a one-stop shop for managing the transaction processing as well as monitoring them.

B2B Pipelines.

B2B pipelines encapsulate the protocol-specific interpretation of the transaction messages. These include sending protocol-specific ack/nacks back to the sender and applying all validation rules on the syntax and content of the transaction. The users can combine the B2B processing with the EAI aspects of the Integration service and route the message along for other processing or for storing in LOB systems. The B2B pipelines use the same infrastructure as the EAI pipelines. Because EDI processing is fairly fixed for a specific transaction type, these pipelines may be run as an elastic scale service that is similar to the fixed EAI pipelines above.

Workflow Foundation

.NET 4.0 offers Workflow Foundation (WF) with deep integration with WCF, which enables the use of IIS/WAS as a first-class host for running workflows. This, in turn, enables workflows to run in the Azure web roles. Long running workflow application components are inherently stateful and require support for state management. With the next generation middleware platform, WF components are hosted in the Container which supports scalable and available application logic. WF runtime takes advantage of both the Container and Messaging capabilities of the Middleware Platform. Deeply integrating workflows with the messaging component make it significantly easier for users to create highly reliable solutions, with the required consistency and durability guarantees across message queues and workflow instances. This integration also allows workflow to take advantage of the routing and partitioning capabilities of the messaging component itself, which supports the efficient scale-out of workflows.

Integration within the Middleware Platform environment will also allow for enhanced workflow management capabilities, via a Management console. The console allows users to see the status of their running workflows, perform control operations (e.g. suspend, resume, terminate) and drill into the detailed execution history of selected workflows. A visualization component allows users to see workflow tracking information superimposed on top of the workflow diagram representation. This allow users to see workflow status in an intuitive way, with high fidelity to their authoring experience.

WF provides a natural platform for building long-running, durable application logic. The definition of such long-running programs, though, as well as common patterns in workflow composition, necessitates that the platform provide flexibility in how workflow definitions are composed and updated. WF in the Middleware Platform provides support for dynamic update, or the capability to update the program definition of running workflow instances. WF will also provide support for versioning of workflows by defining a unique identity to workflow definitions, as well as the ability for Containers to associate workflow instances with their definition identities.

Rules

Rules are pieces of business logic that are externalized from the business process artifacts so that they can be managed and modified independent of business process. Rules are usually authored and managed by business users or IT administrators. Business users author and manage rules which related to business needs, for example, rules for validation of health claims. Rules can change based on changes in government policy, business needs, market conditions, etc. The business processes interact with these rules in a manner largely agnostic of the actual instances of the business rules. Business rules can be modified and managed through appropriate approval process, also called rule governance.

Rules Authoring.

Rules are authored by Business User (BU)/Information Worker (IW) or IT admin in a manner that is easy for them to author and comprehend without requiring huge learning ramp. Authoring tools can be some familiar tools, such as spreadsheet or word processing programs, or some easy to use interface in a portal or based on some domain specific forms based user interface.

Rules Integration with Business Process.

Rules need to integrate with business process artifacts like workflow or some other .Net code. Artifacts are developed in VISUAL STUDIO®, and they need to be able to integrate with rules in a manner that does not require strong coupling with the actual business rules that may be invoked by the artifact. The actual rules may change without changing the artifact or even running instance of the artifact. Invocation of rules from a business process may be done by direct invocation or may be indirect as a result of some event in some business object.

Rules Management and Governance.

Management of rules has two aspects. Rules do need to be managed by source code control in order to keep track of history and manage changes. However, once rules are changed and ready for consumption they need to be deployed. Before deployment, the rules may have to go through an approval process through which business users review the rules and approve them and also may attach some activation policies. Activation policies are simple criteria that define when the new rules should be activated. For example, a rule may need to be activated only during certain periods.

Windows Communication Foundation

In one embodiment, Windows Communication Foundation (WCF) provides support the Middleware Platform. WCF is a part of .NET framework that provides a unified programming model for rapidly building services. Service-oriented communication is a common application pattern used in a composite application and in this section refers to components interacting via messages. Windows Communication Foundation allows developers to build the application logic without having to write communication protocol specific code. WCF provides support for an extensive set of communication technologies out of the box: HTTP, TCP, named-pipes, queues, peer networking WCF provides extensibility for plugging additional communication protocols. WCF provides a service runtime with rich set of capabilities for running and managing the service application logic, such as transactions, instancing, throttling, monitoring, etc.

Tools

The Middleware Platform may include tools for designing the Composite Application and for developing application logic using framework components. The designer allows the user to author the end-to-end application that includes definitions of constituent application components, middleware services, and compositions amongst them. As described previously, the designer generates the Application Manifest that includes the definition manifests for constituent services, compositions, required code artifacts, configuration files, etc. The Middleware Platform may leverage tools, such as ASP-.NET, WF (Workflow designer), WCF, EF, and Rules, for developing the framework components.

Middleware Service Management Platform

Previous sections described the collection of middleware services that are offered in the Middleware Platform. These services are built using a Composition Model and Container. These services may be hosted both on premises-based and cloud-based platforms. Every component and layer in the Middleware Platform architecture stack is designed with symmetry in mind. Infrastructure management, such as machine/VM provisioning, software provisioning, and systems management, may be different between the Middleware Platform and the host. These differences may be captured and abstracted away in a Service Management Platform layer. This layer provides the following functionality:

- Environment Configuration. This component provides an abstraction for VM provisioning, setup, and upgrade functions on premises and cloud-based platforms. This component may provide a uniform provisioning abstraction to the Container.
- Service Management and Monitoring. Manages the physical deployment, diagnostics, and monitoring.
- Tenant and Usage Management. This component provides support for tenant provisioning, metering, and billing.
- Uniform Security, Authentication, and Auditing abstractions.

In one embodiment, the Container and Management layers sit on top of the Service Management Platform layer, thereby providing deployment environment independence to all the Middleware Platform components.

Many of the functions described herein may be implemented in hardware, software, and/or firmware, and/or any combination thereof. When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

The software code segments may be stored in any volatile or non-volatile storage device, such as a hard drive, flash memory, solid state memory, optical disk, CD, DVD, computer program product, or other memory device, that provides computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
creating a composite manifest that identifies a plurality of service groups that are components of a composite application, each of the service groups associated with one or more policies, the composite manifest comprising: (i) a service manifest including service metadata, wherein the service metadata includes service type, health properties, pertinent load balancing metrics, service binaries, and service configuration files, (ii) an application manifest including service composition metadata, wherein the service composition metadata includes stable names, partitioning scheme, instance count and replication factor, security and isolation policy, placement constraints, configuration overrides, service types of constituent services, and load balancing domains into which the constituent services are placed, and (iii) a cluster manifest including physical infrastructure metadata, wherein the physical infrastructure metadata includes machine names, machine types and description, network topology, and upgrade domains;
identifying the constituent services based upon the application manifest;
deploying the identified constituent services on a plurality of nodes, wherein each node is identified based upon the cluster manifest, each node comprising a host operating system running on a processor;
managing the composite application by controlling the services on the plurality of nodes based, at least in part, upon a load balancing operation specified in the service manifest;
monitoring an operation of the constituent services; and
reporting on a performance of a monitored operation, wherein the composite application includes an online shopping application comprising at least: a shopping service, a checkout service, a caching service, and an order processing service.

2. The method of claim 1, wherein deploying the services comprises:
deploying the services to nodes on on-premises equipment or to nodes on a cloud service or to both.

3. The method of claim 1, further comprising:
optimizing the composite application based upon a monitored operation of the service.

4. The method of claim 1, wherein the composite application contains both stateless services and stateful services, the method further comprising:
partitioning a first service to scale the composite application; and
replicating a second service to maintain availability of the composite application.

5. The method of claim 1, wherein the application manifest identifies services selected from a group of predefined middleware services.

6. The method of claim 5, wherein the application manifest further identifies services defined by custom application logic.

7. The method of claim 1, wherein the plurality of nodes comprise host operating systems running on physical hardware.

8. The method of claim 1, wherein the plurality of nodes comprise host operating systems hosted on virtual machines.

9. The method of claim 1, wherein the plurality of nodes comprise host operating systems running on physical hardware and host operating systems hosted on virtual machines.

10. The method of claim 1, further comprising:
deploying the services based on placement constraints specified by the application manifest.

11. The method of claim 10, wherein the placement constraints comprise a minimum service level agreement guarantee.

12. The method of claim 1 wherein the nodes are hosted on a pool of hardware shared by a plurality of applications.

13. The method of claim 1, wherein the composite manifest is a schematized XML document.

14. A distributed computing system, comprising:
a plurality of network nodes on one or more hardware processors, each of the nodes hosting one or more services used in a composite application, wherein a composite manifest identifies a plurality of service groups associated with a composite application, each of the service groups associated with one or more policies, the composite manifest comprising: (i) a service manifest including service metadata, wherein the service metadata includes service type, health properties, pertinent load balancing metrics, service binaries, and service configuration files, (ii) an application manifest including service composition metadata, wherein the service composition metadata includes stable names, partitioning scheme, instance count and replication factor, security and isolation policy, placement constraints, configuration overrides, service types of constituent services, and load balancing domains into which the constituent services are placed, and (iii) a cluster manifest including physical infrastructure metadata, wherein the physical infrastructure metadata includes machine names, machine types and description, network topology, and upgrade domains
an application manager configured to:
identify the constituent services based upon the application manifest;
deploy the identified constituent services on a plurality of nodes, wherein each node is identified based upon the cluster manifest;
manage the composite application by controlling the services on the plurality of network nodes based, at least in part, upon a load balancing operation specified in the service manifest, each node comprising a host operating system running on a processor;
monitoring an operation of the constituent services; and
reporting on a performance of a monitored operation, wherein the composite application includes an online shopping application comprising at least: a shopping service, a checkout service, a caching service, and an order processing service.

15. The distributed computing system of claim 14, wherein the plurality of network nodes comprise host operating systems running on physical hardware and host operating systems hosted on virtual machines.

16. A computer-readable storage device having computer-executable instructions stored thereon that, upon execution by at least one processor of a computer system, cause the computer system to:
create a composite manifest that identifies a plurality of service groups that are components of a composite application, each of the service groups associated with one or more policies, the composite manifest comprising: (i) a service manifest including service metadata, wherein the service metadata includes service type, health properties, pertinent load balancing metrics, service binaries, and service configuration files, (ii) an application manifest including service composition metadata, wherein the service composition metadata includes stable names, partitioning scheme, instance count and replication factor, security and isolation policy, placement constraints, configuration overrides, service types of constituent services, and load balancing domains into which the constituent services are placed, and (iii) a cluster manifest including physical infrastructure metadata, wherein the physical infrastructure metadata includes machine names, machine types and description, network topology, and upgrade domains;

identify the constituent services based upon the application manifest;

deploy the identified constituent services on a plurality of nodes, wherein each node is identified based upon the cluster manifest, each node comprising a host operating system running on a processor;

manage the composite application by controlling the services on the plurality of nodes based, at least in part, upon a load balancing operation specified in the service manifest;

monitor an operation of the constituent services; and reporting on a performance of a monitored operation, wherein the composite application includes an online shopping application comprising at least: a shopping service, a checkout service, a caching service, and an order processing service.

17. The computer-readable storage device of claim 16, wherein the composite application contains both stateless services and stateful services, and wherein the computer-executable instructions, upon execution by the at least one processor, further cause the computer system to:

partition a first service to scale the composite application; and replicate a second service to maintain availability of the composite application.

* * * * *